Inventor
Hugh S. Brown

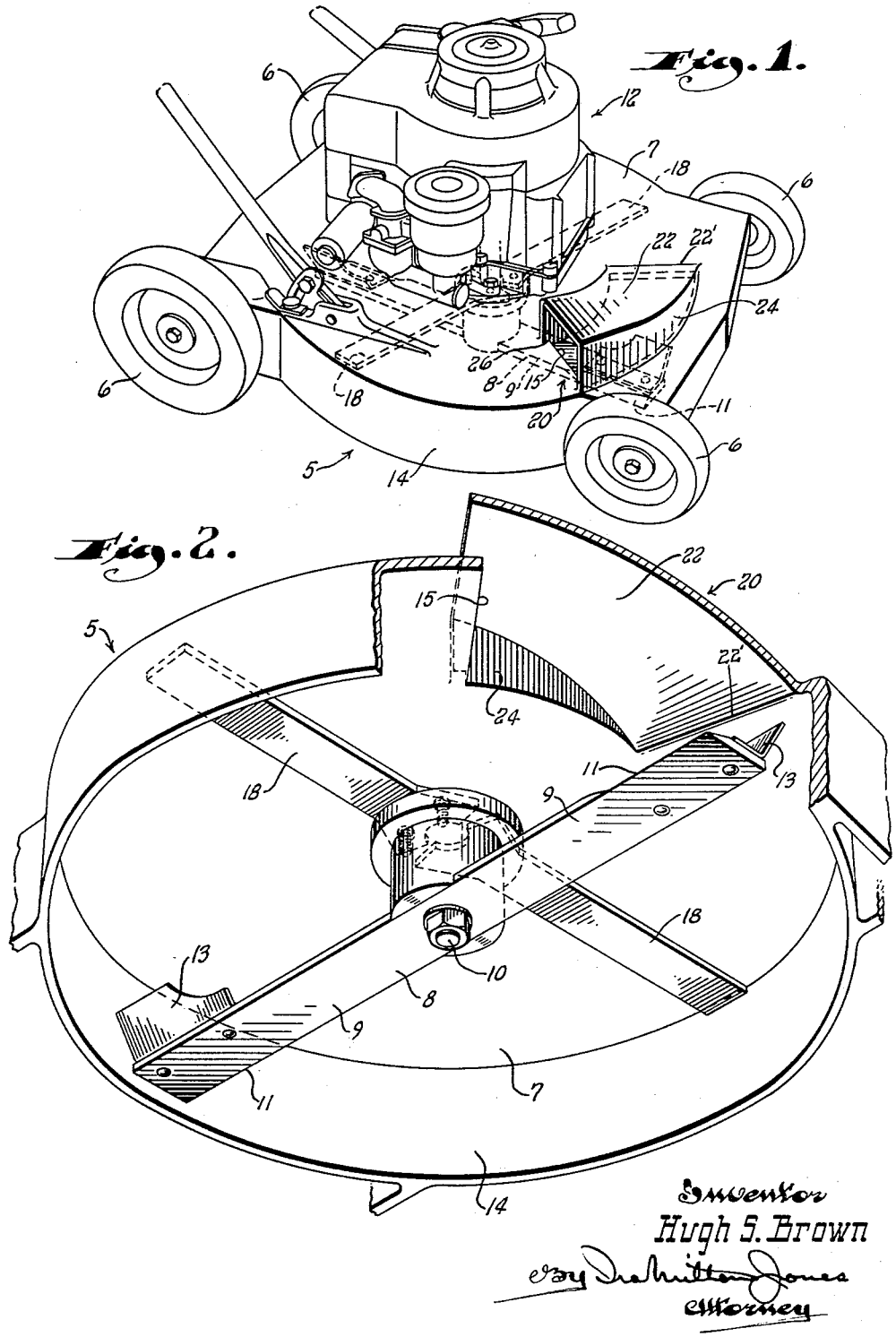

United States Patent Office 2,957,295
Patented Oct. 25, 1960

2,957,295

GRASS CLIPPING DISCHARGE FOR POWER LAWN MOWER

Hugh S. Brown, Wauwatosa, Wis., assignor to Briggs & Stratton Corporation, Milwaukee, Wis., a corporation of Delaware Filed May 1, 1958, Ser. No. 732,285

1 Claim. (Cl. 56—25.4)

This invention relates to power lawn mowers of the rotary type wherein cutter blades are mounted for power driven rotation on an upright axis, and the invention refers more specifically to a rotary lawn mower having an improved means for discharging grass clippings.

In general, power lawn mowers of the type here under consideration have a wheeled carriage which includes a substantially flat deck. Mounted on the deck is a gasoline engine or other power means, and under the deck is a cutter comprising two or more blades mounted for rotation on an upright axis and drivingly connected with the power means. Extending downwardly from the deck is a skirt which surrounds the cutter closely adjacent to the orbit of the blade tips and prevents grass clippings from being thrown outwardly in all directions from the cutter blade.

Heretofore in rotary power lawn mowers there has been an outlet at one side of the skirt through which grass clippings may be discharged from beneath the carriage and thrown to one side of the machine. The general past practice has been to locate the clipping discharge outlet substantially at the plane of the rotating cutter blades, and rely primarily upon the centrifugal action of the cutter to expel grass clippings through the outlet.

However, this type of clipping discharge has not been entirely satisfactory. The cutter throws the grass clippings upwardly as well as readily outwardly, and since the fresh clippings are moist and sticky they clog the discharge outlet and cling to the under side of the carriage deck, accumulating in a mat or pad thick enough to interfere with cutter operation. The accumulation of clippings on the under side of the deck is annoying because the clippings cannot very well be cleaned away without stopping the mower and tilting it on its side, and the weight and bulk of the mower make this an awkward operation. More serious is the clogging of the discharge outlet, because this presents a temptation to the operator to reach in and dislodge the obstruction while the blades are rotating.

It is therefore an object of this invention to provide a rotary power lawn mower of the character described having means for effectively preventing any serious accumulation of grass clippings and the like on the under side of the carriage deck to thus eliminate the need for periodically tipping up the mower and manually dislodging accumulated clippings.

Another object of this invention resides in the provision of a rotary power lawn mower of the character described wherein grass clippings are discharged through a passage having its inlet defined by an aperture in the deck and having its outlet located entirely above the level of the deck, so that there is little tendency for the grass clipping discharge outlet in the power lawn mower of this invention to become clogged by accumulations of grass clippings, thus eliminating the temptation to the operator to clear the clipping outlet by inserting his finger or toe into it.

It is also an object of this invention to provide a rotary power lawn mower having a scraper for continuously dislodging accumulations of grass clippings on the under side of the carriage deck when the mower is in operation, and having a grass clipping discharge outlet which cooperates with the scraper by providing ready exit from beneath the deck for clippings dislodged by the scraper.

Still another object of this invention resides in the provision of a rotary power lawn mower of the character described which affords unusual safety to the operator because the skirt which projects downwardly from its carriage deck extends unbrokenly and imperforately around the cutter blade orbit and thus prevents stones and other hard objects from being thrown outwardly by the rotating cutter blades.

With a view to providing even greater safety to the operator, the invention has as a further object to provide a rotary power lawn mower with a discharge chute through which the grass clippings leave the mower and which chute has its outlet so oriented that solid objects such as stones which might be discharged along with the grass clippings can not become a source of danger.

A still further object of this invention is to provide a rotary power lawn mower with a discharge chute for grass clippings, so disposed as to make it feasible to equip the mower with a grass catcher or receptacle to receive the grass clippings.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claim.

The accompanying drawings illustrate several complete examples of the physical embodiments of the invention constructed according to the best modes so far devised for the practical application of the principles thereof, and in which:

Figure 1 is a side perspective view of a rotary power lawn mower embodying the principles of this invention, the handle being broken away;

Figure 2 is a perspective view, enlarged with respect to Figure 1, of the carriage and cutter of the rotary power lawn mower of this invention as viewed from the underside and with portions broken away;

Figure 3:
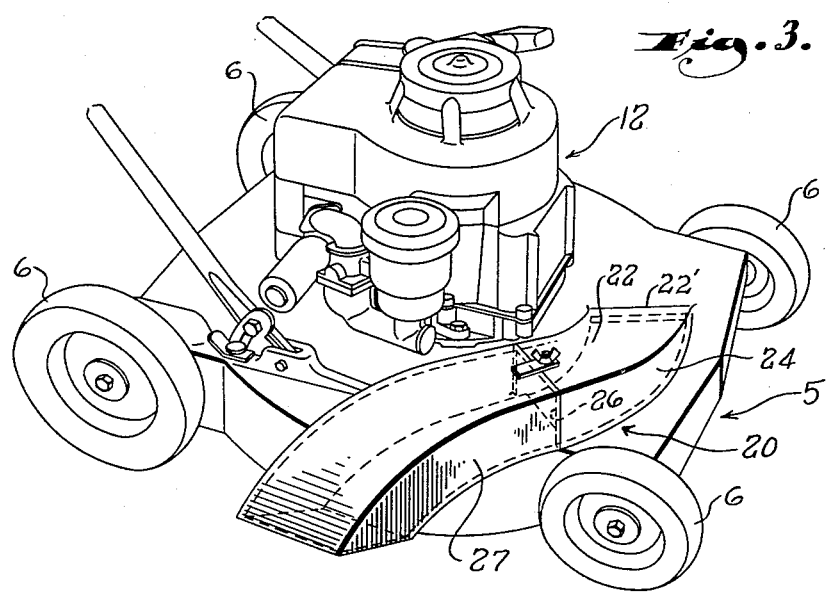
Figure 4:
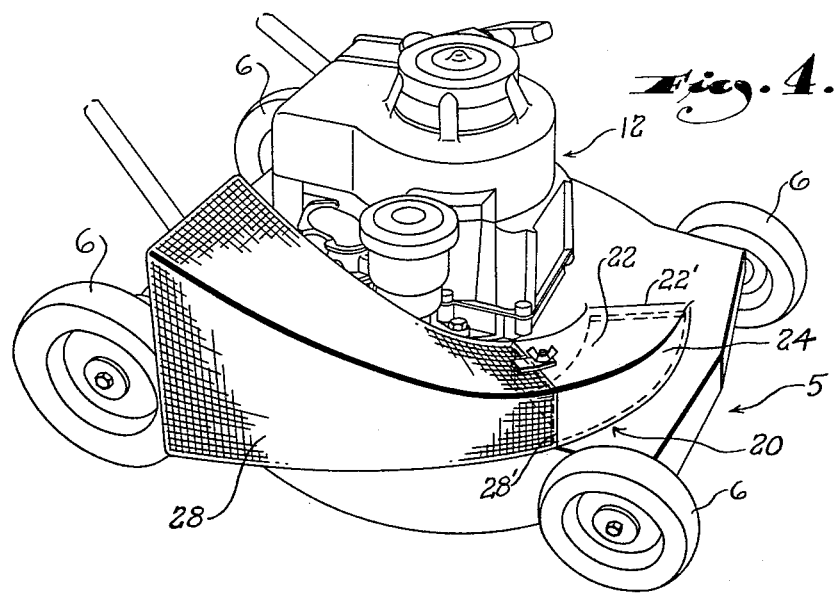

Figure 3 is a perspective view similar to Figure 1, but illustrating a modified embodiment of the invention which is characterized by the provision of a discharge chute for the grass clippings so arranged that the material issuing therefrom is directed downwardly onto the ground; and Figure 4 is a perspective view similar to Figure 1 but showing how easily the mower of this invention may be equipped with a grass catcher.

Referring now to the accompanying drawings, the numeral 5 designates generally the carriage of a power lawn mower of the rotary type mounted on freely rotatable wheels 6 which are adapted to roll over a lawn or other substantially plane surface. The carriage includes a substantially flat deck 7 which is held spaced above the ground by the wheels, and a cutter 8 is mounted beneath the deck for rotation on an upright axis. The cutter comprises a pair of blades 9, each projecting substantially radially from a cutter shaft 10 and having its leading edge sharpened, as at 11.

Mounted above the deck is a power drive means 12, in this case shown as a small single cylinder gasoline engine, but which, as is well known, could also be an electric motor. The cutter shaft 10 may comprise a downward extension of the engine crankshaft, or the drive means is otherwise connected with the cutter to impart rotation in one direction to the latter, but in any event the blades are driven in an orbit to cause their sharpened leading edges to cut through grass in the same way as a sickle. Customarily the trailing edge of each cutter blade in a rotary lawn mower has a slight upward inclination whereby air is drawn upwardly into the cutter disc as the blades rotate, and the upwardly moving air stream created by this fan-like or propeller action of the cutter straightens the blades of grass beneath the deck and draws them upwardly into the cutter blades to insure an even cutting of the lawn. In the lawn mower of the present invention provision is likewise made for producing a strong updraft of air through the cutter disc, and to that end each cutter blade has an upwardly inclined air deflector 13 extending along the tip portion of its trailing edge.

Extending downwardly from the deck to form a housing therewith, inside of which the cutter blades rotate, is a skirt 14 which closely surrounds the orbit of the cutter blade tips and stops the flight of any object picked up by the blades and propelled tangentially outwardly by them. Heretofore the skirt in mowers of the type here under consideration has been provided with an opening at one side thereof that serves as an outlet through which grass clippings can be thrown outwardly from under the deck. However, it was also possible for heavier articles to be propelled through the grass discharge outlet, with possible great danger to nearby persons and property.

The skirt 14 which projects downwardly from the deck of the mower of the present invention extends imperforately and unbrokenly entirely around the blade orbit and consequently said skirt provides a completely effective barrier, preventing any article picked up and thrown outwardly by the spinning cutter blades from flying outwardly beyond it.

The clipping discharge outlet in the skirt of prior rotary lawn mowers had a further disadvantage in that it was not located in the actual path of cutter propelled motion of many of the glass clipping particles. A substantial proportion of the clippings were propelled upwardly by the updraft of air generated by the rotating cutter, rather than outwardly through the discharge outlet in the skirt, and being moist and sticky, the freshly cut clippings tended to adhere to the under side of the deck and to build up thereon in a substantial mat which, after a time, became so thick as to interfere with the cutting action of the blades. In the lawn mower of this invention the clipping discharge aperture is in the deck, being provided by an opening 15 located over a segment of the cutter orbit at the radially outer portion thereof. This location of the discharge opening permits the clippings to be carried upwardly from beneath the deck along with the updraft of air through the cutter, and thus facilitates the discharge of clippings. The unbroken and imperforate skirt around the cutter in the mower of this invention is of course made possible by the fact that the grass clipping discharge opening 15 is located in the deck.

To prevent the accumulation of grass clippings at the discharge opening or aperture 15 and tempting an operator to insert his hand or foot thereinto and bringing it into possible engagement with the rotating cutter, the lawn mower of this invention is provided with a pair of scraper blades 18, each fixed to and extending radially from the cutter shaft and lying in a plane spaced above that of the cutter blades and adjacent to the under side of the deck. The scraper blades, of course, rotate in unison with the cutter, and, as will be apparent, not only keep the grass clippings from accumulating at and possibly blocking the discharge opening, but also prevent any serious accumulation of grass clippings on the under side of the deck. No particular shape is necessary for the scraper blades, but their length is preferably substantially equal to that of the cutter blades so that they sweep substantially the entire deck areas within the skirt. It will be observed that the scraper blades consume only a negligible amount of power, since they act constantly during operation of the mower and therefore are never called upon to dislodge a large or heavy clump of grass clippings; and that because the scraper blades keep the clippings from forming a compacted mass the updraft of air through the outlet is fully capable of carrying and discharging the clippings from the machine.

Preferably the grass clippings discharged from beneath the carriage should be thrown to one side thereof, rather than being allowed to blow back onto the engine and the operator. To that end the clipping outlet in the deck opens into a laterally extending discharge passage 20, comprising a channel-like hood over the aperture 15 which serves as a deflector whereby grass clippings issuing from the outlet are deflected laterally to one side of the mower carriage. The hood or deflector comprises an arcuately elongated top wall 22, extending completely across the aperture 15 and having its longitudinal side edges curved substantially concentrically around the cutter axis, and a pair of flange-like side walls 24 which connect the top wall with the deck. The top wall is inclined upwardly and in the direction of cutter blade rotation, its lower end 22' being joined with the deck adjacent to one radial edge of the clipping discharge outlet, while its higher end is over the other radial marginal edge portion of said aperture. The side walls 24 of the discharge passage extend along each circumferential edge of the clipping discharge aperture in the deck. It will be seen that the mouth 26 of the discharge passage just described is disposed entirely above the level of the deck, and preferably it is located closely adjacent to the longitudinal axis of the carriage and faces to one side of the carriage so that it provides for discharge of clippings in a direction substantially transverse to that of carriage motion.

The clipping discharge passage, like the aperture 15 is kept clean by the constant draft of air therethrough, thus making it unnecessary for an operator to put a hand or foot into the discharge outlet while the blade is rotating. Moreover, the hood over the aperture 15 serves as a guard to prevent an operator from accidentally or intentionally putting his foot through the opening 15 and into the path of the revolving scraper blades.

If desired, the clipping discharge passage 20 may be extended by the addition of an outlet end portion 27, as shown in Figure 3. The specific shape and manner of attaching this outlet end portion is a matter of choice. It may be permanently mounted on the mower carriage, or it may be detachably secured thereto; but, in any event, it is desirable that it be so oriented and arranged that its outlet points downward so that solid objects such as stones which might be kicked up by the blades and thrown out with the grass clippings, are directed harmlessly onto the ground.

The mower of this invention also has the advantage of facilitating the attachment of a grass catcher or receptacle to receive the clippings issuing from the chute or passage 20. This feature is illustrated in Figure 4, where a receptacle 28 of suitable construction is mounted on the deck of the mower with the mouth 28' of the receptacle placed to receive grass clippings from the chute or discharge passage 20.

From the foregoing description taken in connection with the accompanying drawings, it will be apparent that this invention provides a power lawn mower of the rotary type having a discharge outlet which tends to keep itself clean and free from accumulations of grass clippings and which affords unusual safety to the operator because the cutter blade is entirely surrounded by an unbroken and imperforate skirt whereby articles are prevented from being thrown outwardly by the whirling cutter blades. It will also be apparent that the lawn mower of this invention has a substantially self-cleaning grass discharge outlet, which is so arranged and located as to discourage a person from inserting a hand or foot thereinto while the cutter is rotating; and that the invention achieves maximum safety to the operator by making it possible to deflect the discharging grass clippings and any solid objects thrown out therewith down onto the ground, or into a suitable grass catcher or receptacle.

What is claimed as my invention is:

In a rotary power lawn mower of the type comprising a wheeled carriage having a deck, cutter blades mounted beneath the deck on an upright shaft rotatably carried by the carriage, and a skirt projecting downwardly from the deck and extending around the orbit of the cutter blades to preclude radial discharge of objects out of the area swept by the cutter blades: the deck having a hole therein close to its junction with the skirt to provide an outlet for grass clippings, said hole having opposite edges which are substantially radial to the shaft axis; means providing a grass clipping outlet chute above the hole in the deck, comprising an inclined top wall extending obliquely upwardly from one of said substantially radial edges of the hole in the deck and circumferentially in the direction of cutter blade rotation, across the hole, and a pair of spaced apart side walls, each connecting the deck and said top wall and extending circumferentially in the direction of cutter blade rotation; an upwardly and rearwardly inclined deflector at the trailing edge of each cutter blade for creating an updraft when the cutter blades are rotated, whereby grass clippings may be carried upwardly through the aperture in the deck and out of the outlet passage; and scraper blades carried by said upright shaft for rotation therewith and extending radially therefrom, at an elevation above that of the cutter blades and closely underlying the deck, said scraper blades being angularly spaced from the cutter blade so as not to lie above the latter and extending radially a distance such that their tips are closely adjacent to the skirt, so that as said scraper blades rotate they dislodge grass clippings from the under surface of the deck and thus keep the hole in the deck open.

References Cited in the file of this patent

UNITED STATES PATENTS

| | | |
|---|---|---|
| 1,336,257 | Muzzy | Apr. 6, 1920 |
| 2,641,100 | Sylvester | June 9, 1953 |
| 2,720,070 | Arrington | Oct. 11, 1955 |
| 2,760,327 | Bovee | Aug. 28, 1956 |
| 2,762,188 | Klein | Sept. 11, 1956 |
| 2,764,865 | Pollard | Oct. 2, 1956 |
| 2,777,270 | Colclazier | Jan. 15, 1957 |
| 2,807,126 | Bennett | Sept. 24, 1957 |
| 2,836,024 | Davis et al. | May 27, 1958 |
| 2,836,029 | Johnson | May 27, 1958 |
| 2,882,668 | Murillo | Apr. 21, 1959 |